United States Patent

Janssen

[15] 3,663,747

[45] May 16, 1972

[54] TELEVISION RECEIVER WITH PHASE DETECTOR CONTROLLED SOUND SUPPRESSION FILTER

[72] Inventor: Peter Johannes Hubertus Janssen, Emmasingel, Eindhoven, Netherlands

[73] Assignee: U.S. Philips Corporation, New York, N.Y.

[22] Filed: Dec. 3, 1969

[21] Appl. No.: 881,740

[30] Foreign Application Priority Data

Dec. 10, 1968 Netherlands..........................6817659

[52] U.S. Cl...........................178/5.8 R, 178/5.8 A, 325/472, 325/488, 333/17, 334/15

[51] Int. Cl...........................................................H04n 5/60

[58] Field of Search................178/5.8 A; 325/327, 472, 165, 325/166; 333/17

[56] References Cited

UNITED STATES PATENTS

| | | | |
|---|---|---|---|
| 3,375,325 | 3/1968 | Janssen | 178/5.8 A |
| 2,880,269 | 3/1959 | Dome | 178/5.8 A |
| 2,953,637 | 9/1960 | Baugh, Jr. | 178/5.8 A |
| 2,976,408 | 3/1961 | Colaguori | 333/17 |
| 3,281,698 | 10/1966 | Rose, Jr. | 325/420 |

*Primary Examiner*—Benedict V. Safourek
*Assistant Examiner*—Donald E. Stout
*Attorney*—Frank R. Trifari

[57] ABSTRACT

A television receiver has video and audio I.F. sections. An audio carrier trap with a varactor tuned diode is located in either a common I.F. section or the video I.F. section. A phase detector has two inputs coupled to the audio and video sections respectively and an output coupled to the varactor diode. Therefore, as the local oscillator is adjusted, the audio trap is always tuned to the sound carrier.

4 Claims, 1 Drawing Figure

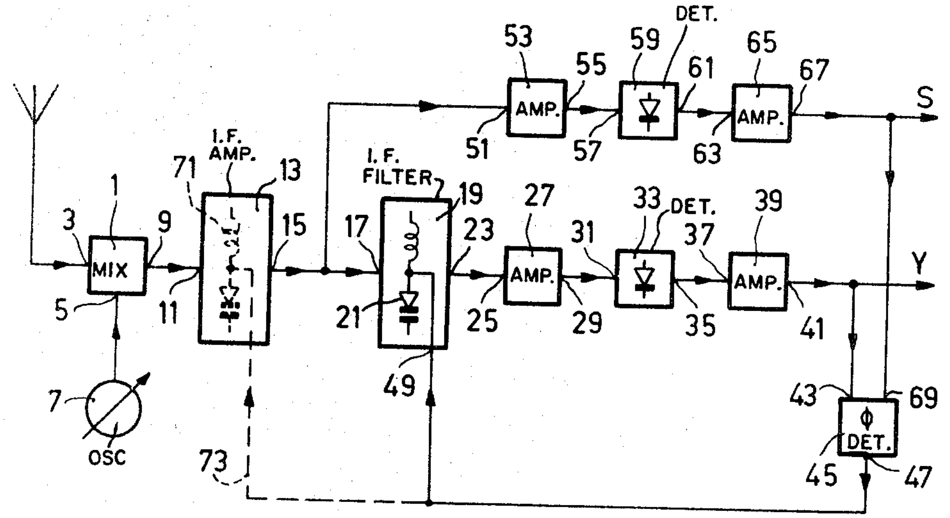
INVENTOR.
PETER J.H. JANSSEN
BY
Frank R. Trifari
AGENT

TELEVISION RECEIVER WITH PHASE DETECTOR CONTROLLED SOUND SUPPRESSION FILTER

The invention relates to a television receiver including a mixer stage and an intermediate frequency amplifier coupled to an output of the mixer stage, which IF amplifier includes an IF-sound carrier suppression filter an output of which is coupled to an input of a detector an output of which detector is coupled to a control voltage input of an adjustable reactance circuit coupled to the said filter, the television receiver furthermore including a signal path splitting circuit having an input to which at least the picture and sound signal information is applied, a first output which is coupled to a first IF signal path and a second output which is coupled to a second IF signal path.

A receiver of the kind described above is known from German Pat. specification No. 905.377, wherein the filter is accommodated in the part of the receiver which is common for the picture and sound intermediate frequency signals. In this case the control signal originating from the detector detunes the said filter upon variation of the IF sound carrier amplitude at the output thereof in such a way that a substantially constant IF sound carrier amplitude is obtained at the output of this filter. In cooperation with an automatic gain control active on the picture intermediate frequency this automatic gain control in the known receiver ensures a substantially constant ratio between the amplitudes of the IF picture and sound carrier signals.

In this receiver it is possible to obtain only a small sound carrier suppression as a result of the suppression filter. In fact, for a satisfactory operation of the amplitude ratio control the suppression filter must principally be tuned slightly beside the sound carrier intermediate frequency.

According to the invention a receiver of the kind described in the preamble is characterized in that the said filter is incorporated after the signal path splitting circuit in one of the said intermediate frequency signal paths, while the detector is a phase detector a further input of which is coupled to an output of the sound signal path, the said filter being also arranged as a phase-determining element for the phase detector, and an oscillator coupled to the mixer stage being tunable by external operation.

The Applicant has found that in a receiver of the kind described in the preamble, when equipped with an externally tunable oscillator, in principle provides the possibility of slightly influencing the picture quality by detuning the oscillator while maintaining a given attenuation of the IF-sound carrier. Due to the step according to the invention a very satisfactory possibility of influencing the picture quality as a result of an oscillator detuning is obtained at maximum sound carrier suppression in the luminance signal path. In fact, the IF sound suppression filter is not tuned to a given amplitude ratio, but to a given phase shift which occurs at a frequency coinciding with the frequency at which the maximum intermediate frequency sound attenuation occurs. This maximum attenuation is also maintained when detuning the oscillator, so that the possibility exists to optionally influence the bandwidth of the signal to be handled by the luminance signal path with a minimum disturbance of the picture signal by the sound signal.

In order that the invention may be readily carried into effect, an embodiment thereof will now be described in detail by way of example with reference to the accompanying diagrammatic drawing.

The drawing comprises only one FIGURE which shows with reference to a non-detailed block diagram a portion of a television receiver according to the invention which portion is important for the understanding of the invention.

A mixer stage 1 has an input 3 to which a received television signal is applied. A further input 5 of the mixer stage 1 is connected to an oscillator 7 which can be tuned by means of a tuning device to be operated by the user of the receiver.

An output 9 of the mixer stage 1 is connected to an input 11 of an IF amplifier 13. The IF amplifier 13 amplifies the IF signal formed in the mixer stage 1. This amplified signal appears at an output 15 of the IF amplifier 13 and is applied to an input 17 of an IF sound suppression filter 19.

The IF sound suppression filter 19 includes a reactance circuit which is symbolically shown by a capacity diode 21. An output 23 of the filter 19 is connected to an input 25 of an amplifier 27. An output 29 of the amplifier 27 is connected to an input 31 of a detector 33.

An output 35 of the detector 33 is connected to an input 37 of an amplifier 39 an output 41 of which is connected to an input 43 of a phase detector 45. A control signal output 47 of this detector 45 is connected to a control signal input 49 of the reactance circuit of the IF sound carrier suppression filter 19.

The described signal path from the output 15 of the IF amplifier 13 to the output 41 of the amplifier 39 is called the luminance signal path. In this path successively the IF sound carrier is suppressed by the filter 19, the IF signal is amplified by the amplifier 27, the modulation of the picture carrier is detected by the detector 33, and a subcarrier signal is formed and the detected signal together with the subcarrier signal are amplified by the amplifier 39. Subsequently the subcarrier signal is applied to the input 43 of the detector 45.

The output 15 of the IF amplifier 13 is furthermore connected to an input 51 of an amplifier 53. An output 55 of the amplifier 53 is connected to an input 57 of a detector 59. An output 61 of the detector 59 is connected to an input 63 of an amplifier 65. According to the invention an output 67 of the amplifier 65 is connected to a second input 69 of the detector 45. A subcarrier signal originating from the detector 59 is applied through this connection to the detector 55. According to the invention the detector 45 is furthermore a phase detector and the IF sound carrier suppression filter 19 which is present in the luminance signal path is a phase-determining network for this phase detector 45.

The signal path from the output 15 of the IF amplifier 13 to the output 67 of the amplifier 65 is called the sound signal path.

The operation of the circuit arrangement will now further be described in so far as this is important for a satisfactory understanding of the present invention.

If the oscillator 7 is tuned in such a manner that the picture intermediate frequency is tuned exactly to the middle of the Nyquist edge of the IF amplifier 13, then the intermediate frequency of the sound carrier is such that it coincides with the resonant frequency of the IF sound carrier suppression filter 19. This filter 19 then attenuates the sound intermediate frequency in the luminance signal path to a maximum extent. The phase difference between the subcarrier signals applied to the inputs 43 and 69 of the phase detector 45 will then be 90° so that no control voltage is produced at the output 47 of the detector 45. This phase difference of 90° may be obtained by the filter 19 itself, or by an additional phase-shifting network in one of the signal paths from the output 15 of the IF amplifier 13 to either of the inputs 43 or 69 of the phase detector 45. An arrangement in which a television IF signal is transmitted through two parallel IF paths one of which contains a sound carrier suppression filter and both of which contain detectors for the respective I.F. signals and wherein relative phase displacements of the detected sound carriers due to departure of the I.F. sound carrier from the suppression frequency of the filter, serve to produce a control signal determined by the said phase changes is shown in my U.S. Pat. No. 3,375,325 issued Mar. 26, 1968.

If the oscillator 7 is slightly detuned to influence the picture quality, the intermediate frequency signal in the IF sound carrier suppression filter 19 undergoes a great phase shift. The phase shift remains substantially equal in the rest of the signal paths to the two inputs 43 and 69 of the phase detector 45. As a result of the phase shift in the filter 19 the phase difference between the signals at the inputs 43 and 69 of the phase detector 45 will deviate from 90°. A control voltage is then produced at the output 47 of the phase detector 45, which control voltage is applied through the input 49 to the reactance circuit of the filter 19.

This control voltage attempts to render the phase difference 90° again between the signals at the inputs 43 and 69 of the phase detector 45, by detuning the filter 19 in such a manner that it is tuned to the new sound intermediate frequency. As a result it is achieved that the sound carrier suppression in the luminance signal is again maximum also for the new sound intermediate frequency.

It will be evident that although the phase detector 45 is active in this case on two signals of the subcarrier frequency, it is alternatively possible to apply two signals of intermediate frequency originating from, for example, the inputs 25 and 51 or the outputs 29 and 55 of the amplifiers 27 and 59 to the inputs 43 and 69 of the phase detector 45. In that case the amplification will have to be increased in an other part of the control loop so as to obtain the same control steepness.

Furthermore it is possible to influence the tuning of an optionally present second IF sound carrier suppression filter 71 in the common IF portion 13 of the receiver by means of the control voltage originating from the output 47 of the phase detector 45 and applied through a line 73. As a result it can be achieved that also the ratio between the amplitude of the sound carrier and that of the picture carrier on the detector 59 varies only very slightly in case of a possible detuning of the oscillator 7.

Furthermore it will be evident that the signal paths which are referred to in the embodiment as sound signal path and luminance signal paths, may alternatively have different functions. Thus, for example, in a color television receiver the signal path including the IF sound carrier suppression filter may serve for handling the luminance signal and the other signal path may serve for handling the chrominance signal and the sound signal.

WHAT IS CLAIMED IS:

1. A circuit comprising a first channel having an input coupled to receive a signal having a carrier and a subcarrier and having an output; a second channel having an input coupled to said first channel output; a third channel having an input coupled to said first channel output; first filter means for suppressing said subcarrier coupled to said second channel; said filter means having a variable reactance element and producing phase variations of said subcarrier upon departure of the frequency of the subcarrier from the attenuating frequency of the filter means; and a phase detector having two inputs coupled to said second and third channels respectively and an output means coupled to said element for supplying a control signal thereto to keep said filter tuned to the subcarrier frequency for suppression thereof.

2. A circuit as claimed in claim 1 further comprising a first and second detectors coupled within said second and third channels respectively, the detector of said second channel being coupled between said filter and one of said phase detectors inputs, the remaining detector being coupled in said third channel between said first channel and the remaining detector input.

3. A circuit as claimed in claim 1 wherein said first filter is coupled to said second channel and further comprising a second filter means for suppressing said subcarrier coupled to said first channel having a variable reactance element coupled to said detector output.

4. A circuit as claimed in claim 1 wherein said first channel comprises a mixer having a first input coupled to receive a television signal, a second input, and an output; an oscillator coupled to said mixer second input; and an IF amplifier coupled to said mixer output; whereby said subcarrier comprises an audio subcarrier.

* * * * *